United States Patent
Aoki

(10) Patent No.: US 10,251,206 B2
(45) Date of Patent: Apr. 2, 2019

(54) COMMUNICATION APPARATUS AND CONTROL METHOD OF COMMUNICATION APPARATUS

(71) Applicant: CANON KABUSHIKI KAISHA, Tokyo (JP)

(72) Inventor: Hitoshi Aoki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 14/832,405

(22) Filed: Aug. 21, 2015

(65) Prior Publication Data

US 2016/0065667 A1 Mar. 3, 2016

(30) Foreign Application Priority Data

Sep. 3, 2014 (JP) .................. 2014-179519

(51) Int. Cl.
*H04W 76/14* (2018.01)
*H04W 8/00* (2009.01)
*H04W 48/16* (2009.01)
*H04M 1/725* (2006.01)
*H04L 29/06* (2006.01)

(52) U.S. Cl.
CPC ......... *H04W 76/14* (2018.02); *H04L 65/1069* (2013.01); *H04M 1/7253* (2013.01); *H04W 8/005* (2013.01); *H04W 48/16* (2013.01)

(58) Field of Classification Search
CPC ............... H04L 5/0053; H04L 12/1818; H04L 12/2812; H04L 12/2818; G06F 1/165; G06F 15/16
USPC .......................................... 709/219; 370/338
See application file for complete search history.

(56) References Cited

U.S. PATENT DOCUMENTS

| 8,351,933 | B2* | 1/2013 | Ramer | G06F 17/30867 |
| | | | | 455/432.2 |
| 8,803,954 | B2* | 8/2014 | Banavara | H04N 13/398 |
| | | | | 348/56 |
| 9,037,134 | B2* | 5/2015 | Grob | H04W 36/04 |
| | | | | 455/434 |
| 9,179,499 | B1* | 11/2015 | Fang | H04W 76/10 |
| 2010/0022246 | A1* | 1/2010 | Miki | H04W 36/24 |
| | | | | 455/436 |
| 2010/0311330 | A1 | 12/2010 | Aibara et al. | 455/41.2 |

(Continued)

FOREIGN PATENT DOCUMENTS

| CN | 102474507 A | 5/2012 | |
| EP | 2 634 999 | 9/2013 | ............. H04L 29/08 |

(Continued)

OTHER PUBLICATIONS

XP055238797A—Wi-Fi Display Technical Specification—Version 1.1; pp. 1-151 (2012).

(Continued)

*Primary Examiner* — Tesfay Yohannes
(74) *Attorney, Agent, or Firm* — Venable LLP

(57) ABSTRACT

There are a first search for searching for another communication device by designating a wireless network, and a second search for searching for another communication device without designation of a wireless network. It is controlled to perform the second search together with the first search in accordance with one search instruction from a user. The result of the first search and the result of the second search are displayed to be able to discriminate them.

12 Claims, 13 Drawing Sheets

(56) References Cited

U.S. PATENT DOCUMENTS

| | | | |
|---|---|---|---|
| 2011/0047246 A1* | 2/2011 | Frissora | G06F 9/543 |
| | | | 709/219 |
| 2012/0047457 A1* | 2/2012 | Park | G09B 29/106 |
| | | | 715/781 |
| 2013/0166759 A1 | 6/2013 | Rajamani et al. | 709/227 |
| 2014/0185604 A1* | 7/2014 | Kil | H04W 48/20 |
| | | | 370/338 |
| 2014/0192681 A1 | 7/2014 | Hong et al. | 370/254 |
| 2014/0229890 A1* | 8/2014 | Tokunaga | G09G 5/34 |
| | | | 715/786 |
| 2014/0240768 A1* | 8/2014 | Kimura | G06F 3/1204 |
| | | | 358/1.15 |
| 2015/0040169 A1* | 2/2015 | Hoffert | H04L 65/60 |
| | | | 725/88 |

FOREIGN PATENT DOCUMENTS

| | | |
|---|---|---|
| JP | 2008252360 A | 10/2008 |
| JP | 2012085136 A | 4/2012 |
| JP | 2013-123245 | 6/2013 |
| JP | 2013527717 A | 6/2013 |
| JP | 2013-172275 | 9/2013 |
| JP | 2014-045505 | 3/2014 |

OTHER PUBLICATIONS

XP055186930A—Content Sharing, Syncing, Streaming Protocols for Wi-Fi—Excentis; pp. 1-7 (Aug. 12, 2014).
Joseph Epstein:"Introduction to Wi-Fi" In:"Scalable VoIP Mobility", Aug. 14, 2009 (Aug. 14, 2009), Newnes, XP055335592, ISBN:978-1-85617-508-1, p. 109.
Japanese Office Action issued in corresponding Japanese Application No. 2014/179519 dated Jun. 8, 2018.
Chinese office Action issued in corresponding Chinese Application No. 201510547852.7 dated Mar. 26, 2018.

* cited by examiner

FIG. 14A

SEARCH START

| DEVICE NAME | CONNECTION FORM |
|---|---|
| STA103 | TDLS |
|  | P2P |
| STA105 | P2P |

FIG. 14B

SEARCH START

| DEVICE NAME | CONNECTION FORM |
|---|---|
| STA103 | P2P |
|  | TDLS |
| STA105 | P2P |

FIG. 14C

SEARCH START

| DEVICE NAME | CONNECTION FORM |
|---|---|
| STA103 | TDLS |
| STA105 | P2P |

COMMUNICATION APPARATUS AND CONTROL METHOD OF COMMUNICATION APPARATUS

BACKGROUND OF THE INVENTION

Field of the Invention

The present invention relates to a communication apparatus that transmits/receives an image through a network, and a control method of the communication apparatus.

Description of the Related Art

Wireless local area network (LAN) systems typified by IEEE802.11 have been widely used. In the wireless LAN, a network is controlled by a base station called an access point (AP). A wireless network is built by the AP, and stations (STAs) which exist in the coverage area of the radio wave emitted by the AP and are in a wirelessly connected state. Recently, products and standards for various wireless network forms have appeared on the market, in addition to this conventional simple wireless network configuration of the AP and STA.

There is a wireless network apparatus simultaneously having both an AP function of performing communication as a base station, and an STA function of connecting to the base state and performing communication, in order to participate in a plurality of wireless networks. Such an apparatus can act as the AP and build another network while connecting as the STA to another AP.

Wi-Fi Display is video streaming communication using a wireless network. Wi-Fi Display is a wireless direct streaming technique standardized by Wi-Fi Alliance®. In Wi-Fi Display, a device that transmits a video streaming is called a "source", and a device that receives the video streaming is called a "sink".

In Wi-Fi Display, either Wi-Fi Direct® or Wi-Fi CERTIFIED™ TDLS (Tunneled Direct Link Setup) is used in wireless link layer connection. In Wi-Fi CERTIFIED™ TDLS, a direct link is established to transmit/receive a video streaming between the source and the sink without the intervention of an AP.

In Wi-Fi Direct®, either the sink or source operates as a base station (P2P group owner: P2P GO) like an AP. The other operates as a terminal station (P2P client) like an STA, and performs wireless connection (to be referred to as "P2P connection" hereinafter). The sink and source directly transmit/receive a video streaming.

Japanese Patent Laid-Open No. 2013-172275 discloses a method of controlling, based on information of a wireless network to which a communication partner is connected, and capability information of the communication partner, whether to build another wireless network with the communication partner, or to establish a direct link. Japanese Patent Laid-Open Nos. 2014-045505 and 2013-123245 disclose methods of, when a user desires communication with a wireless terminal participating in a wireless network different from a wireless network in which the user's terminal currently participates, building a combined wireless network including the wireless terminal.

When discovering a wireless network device at a connection destination in Wi-Fi Display, both of peer-to-peer (P2P) search and TDLS search are available. However, when a plurality of wireless network devices are discovered by P2P or TDLS, the user does not determine a wireless network device to be connected and may be confused. Especially in P2P connection, disconnection between a wireless network and a wireless network device before the P2P connection is necessary. If the user selects a wireless network device that performs not TDLS connection but P2P connection, the user's terminal may be disconnected from the originally connected wireless network before the user knows it.

SUMMARY OF THE INVENTION

In an aspect, a communication apparatus comprising: a first search unit configured to search for another communication device by designating a wireless network; a second search unit configured to search for another communication device without designation of a wireless network; a control unit configured to control to perform search by the second search unit together with search by the first search unit in accordance with one search instruction from a user; and a display control unit configured to control display capable of discriminating a search result by the first search unit and a search result by the second search unit.

In another aspect, a control method of a communication apparatus, the method comprising: searching for another communication device by designating a wireless network; searching for another communication device without designation of a wireless network; controlling to perform search in the second searching step together with search in the first searching step in accordance with one search instruction from a user; and controlling display capable of discriminating a search result in the first searching step and a search result in the second searching step.

According to these aspects, search for another communication device without designating a wireless network is performed in accordance with a search instruction, together with search for another communication device by designating a wireless network. The respective search results can be displayed to be able to discriminate them.

Further features of the present invention will become apparent from the following description of exemplary embodiments with reference to the attached drawings.

BRIEF DESCRIPTION OF THE DRAWINGS

FIGS. 14A to 14C are views showing display examples of a device list based on the determination result of a preferential connection form.

DESCRIPTION OF THE EMBODIMENTS

A communication apparatus and a control method of the communication apparatus according to embodiments of the present invention will be described below in detail with reference to the accompanying drawings. Note that the following embodiments are not intended to limit the claims of the present invention, and not all the combinations of features described in the embodiments are necessarily essential to the solution of the present invention. An explanation will be given by exemplifying a wireless LAN system complying with the IEEE802.11 standard.

First Embodiment

[Network Configuration]

Figure 1:
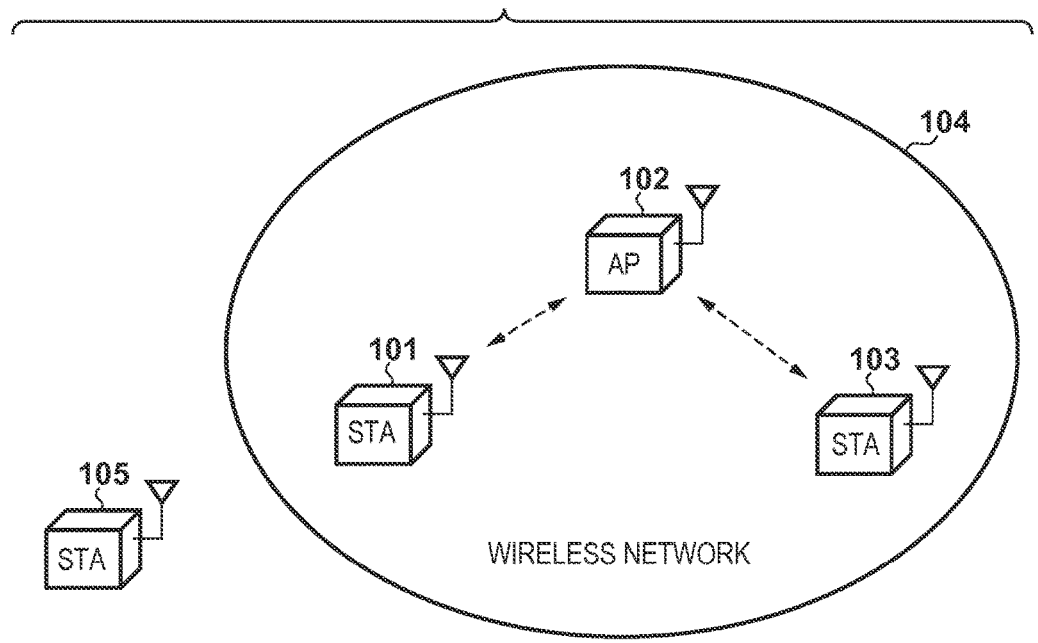
FIG. 1 is a view showing a network configuration according to an embodiment.

FIG. 1 shows a network configuration according to the first embodiment. A station (STA) 101 is a wireless network apparatus and is a video streaming transmission apparatus (source) complying with the Wi-Fi Display standard. The STA 101 can perform Wi-Fi Display streaming using a connection method of either peer-to-peer connection (to be referred to as "P2P connection" hereinafter) or TDLS direct link (to be referred to as "TDLS connection" hereinafter). The STA 101 participates in a wireless network 104 constituted by an access point (AP) 102, and belongs to the wireless network 104.

While participating in the wireless network 104, the STA 101 can establish a TDLS connection with another wireless network device belonging to the wireless network 104, and perform Wi-Fi Display video transmission. When performing Wi-Fi Display video transmission by a P2P connection, the STA 101 needs to leave the wireless network 104.

An STA 103 is a wireless network device that participates in (belongs to) the wireless network 104, and is a video streaming reception apparatus (sink) complying with the Wi-Fi Display standard. The STA 103 can establish a TDLS connection with another wireless network device belonging to the wireless network 104, and perform Wi-Fi Display video transmission.

An STA 105 is a wireless network device and is a video streaming reception apparatus (sink) complying with the Wi-Fi Display standard. The STA 105 can establish a P2P connection and perform Wi-Fi Display video transmission. Note that the STA 105 does not participate in (belong to) the wireless network 104.

[Apparatus Arrangement]

Figure 2:
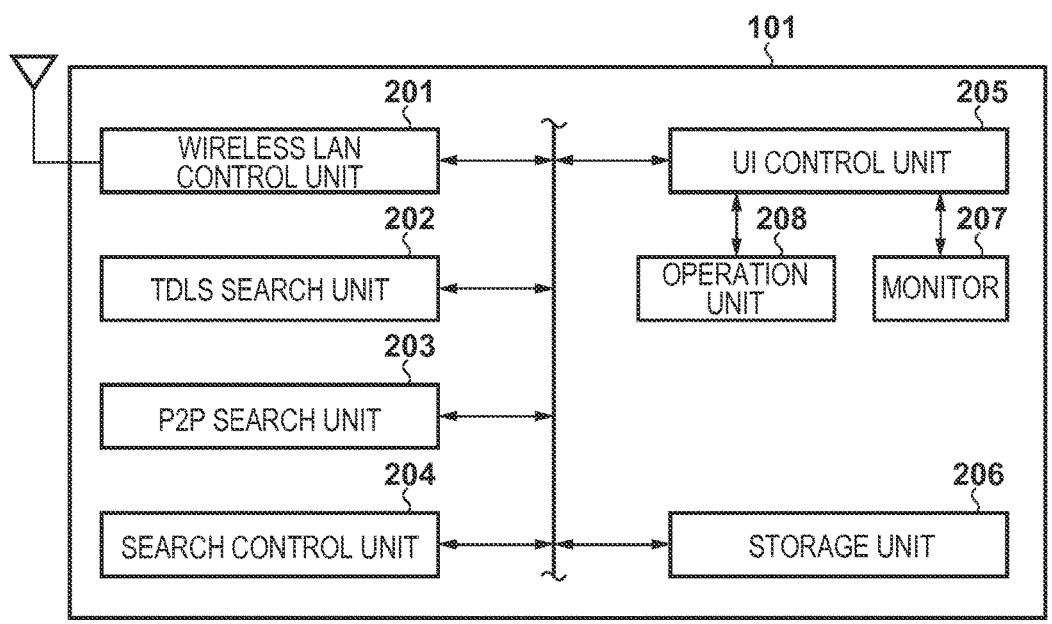
FIG. 2 is a block diagram showing the functional arrangement of a wireless network apparatus.

The functional arrangement of the STA 101 is shown in the block diagram of FIG. 2. A storage unit 206 includes a random access memory (RAM) used as a working memory by a control unit and search unit (to be described later), and a recording medium (for example, a flash memory) that stores computer programs for implementing the control unit and search unit.

A wireless LAN control unit 201 is a communication unit including an antenna, transmission/reception circuit, and the like. The wireless LAN control unit 201 performs transmission/reception (communication) of wireless signals to/from a wireless network device, and communicates with the wireless network device directly or through the access point of the wireless network 104.

A TDLS search unit 202 searches wireless network devices participating in the wireless network 104 for a TDLS-compliant wireless network device (to be referred to as "TDLS device" hereinafter). The TDLS search unit 202 transmits a tunneled probe request and a TDLS discovery request through the wireless LAN control unit 201. The TDLS search unit 202 receives a tunneled probe response and a TDLS discovery response from a TDLS device, thereby discovering the TDLS device.

A P2P search unit 203 executes device discovery defined by Wi-Fi Direct® to search for a P2P connection-compliant wireless network device (to be referred to as "P2P device" hereinafter). The P2P search unit 203 transmits a probe request through the wireless LAN control unit 201, and receives a probe response from a P2P device, thereby discovering the P2P device. In the probe request, a prefix "DIRECT-" is added to SSID (Service Set IDentifier). Further, P2P information elements (to be referred to as "P2PIE" hereinafter) including capability information of a P2P device are added as tags on the frame field of the probe request.

A search control unit 204 controls the TDLS search unit 202 and the P2P search unit 203 to search for Wi-Fi Display-compliant wireless network devices. The search control unit 204 generates a list (to be referred to as a "device list" hereinafter) of discovered wireless network devices, and supplies the device list to a UI control unit 205. The UI control unit 205 controls a user interface (UI) constituted by a monitor 207 serving as a display unit that allows a user to operate the STA 101, an operation unit 208 (touch panel and buttons), and the like, and displays, on the UI, the device list supplied from the search control unit 204.

[Search Processing]

Figure 3:
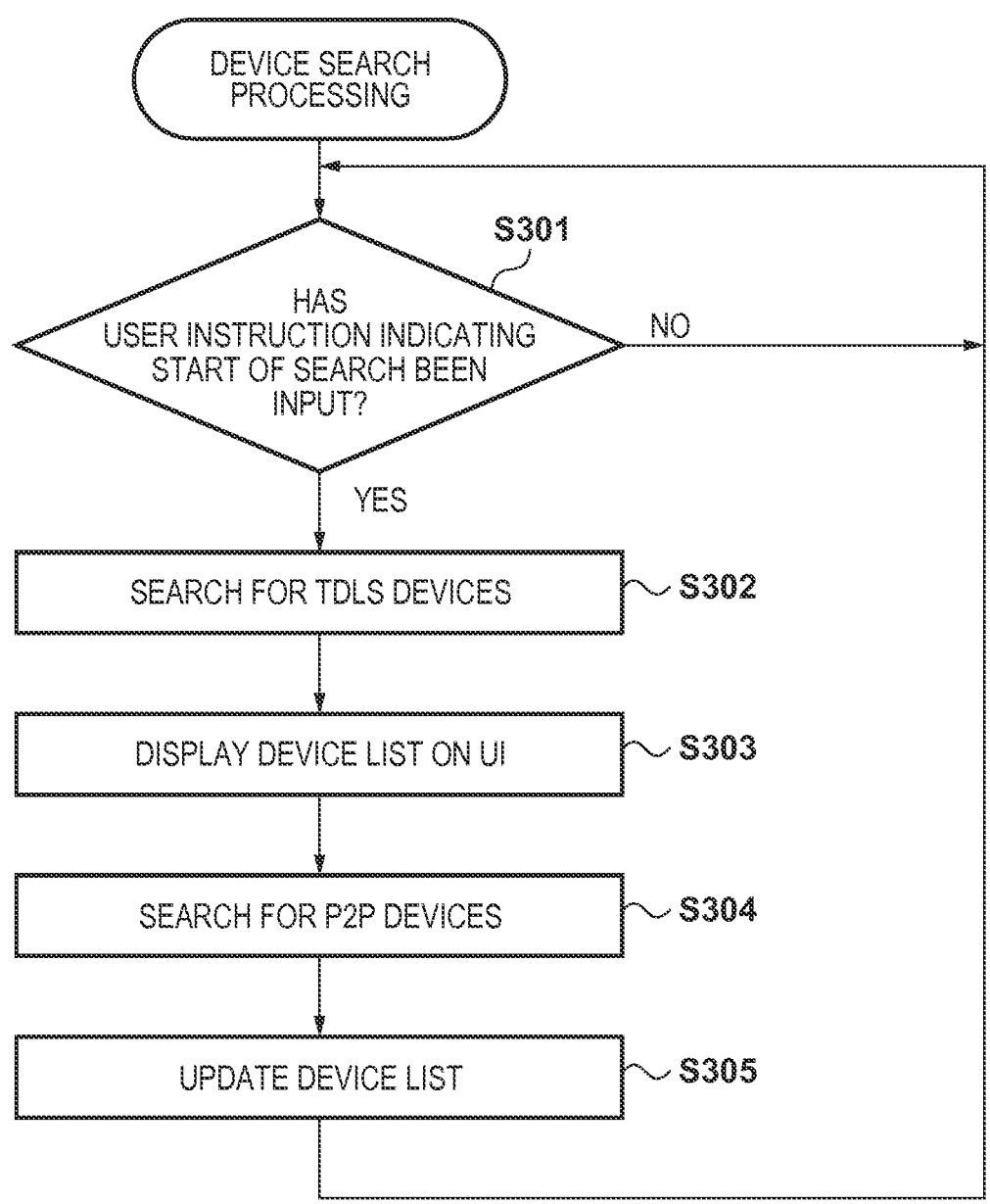
FIG. 3 is a flowchart for explaining device search processing that is executed at the start of Wi-Fi Display video streaming.

Device search processing that is executed at the start of Wi-Fi Display video streaming will be explained with reference to the flowchart of FIG. 3. The search control unit 204 of the STA 101 executes the search processing shown in FIG. 3. The search control unit 204 determines whether a user instruction (to be referred to as "search instruction" hereinafter) indicating the start of search has been input. If no search instruction has been input, the search control unit 204 waits for input of the search instruction (S301).

If the search instruction is input, the search control unit 204 controls the TDLS search unit 202 to search for TDLS devices (S302). The search control unit 204 supplies a device list of discovered TDLS devices to the UI control unit 205, and controls the UI control unit 205 to display the device list on the UI (S303).

After the search for TDLS devices, the search control unit 204 controls the P2P search unit 203 to search for P2P devices (S304). The search control unit 204 supplies, to the UI control unit 205, a device list to which P2P devices are added, controls the UI control unit 205 to update the display of the device list (S305), and returns the process to step S301.

When no TDLS device is discovered, no device list is displayed on the UI in step S303. When no P2P device is discovered, the device list displayed on the UI is not updated in step S305. Alternatively, when no TDLS device is discovered and P2P devices are discovered, a device list of only the P2P devices is displayed on the UI in step S305.

[Search Sequence]

Figure 4:
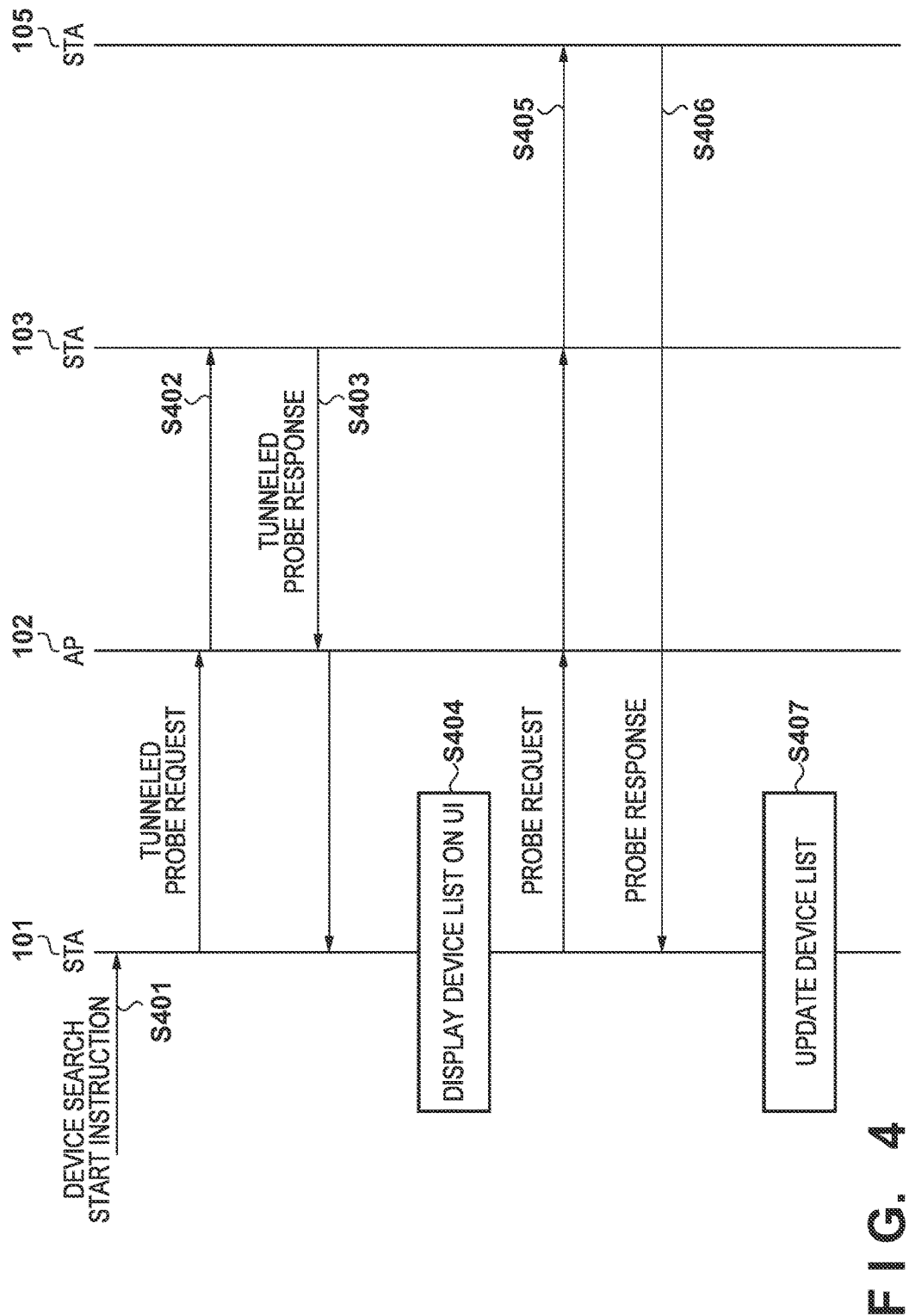
FIG. 4 is a chart for explaining a device search sequence that is executed at the start of Wi-Fi Display video streaming.

A device search sequence that is executed at the start of Wi-Fi Display video streaming will be explained with reference to FIG. 4. The user of the STA 101 designates the start of searching for a sink device by operating the UI of the STA 101 in order to search for Wi-Fi Display-compliant devices (S401).

Figure 5A:
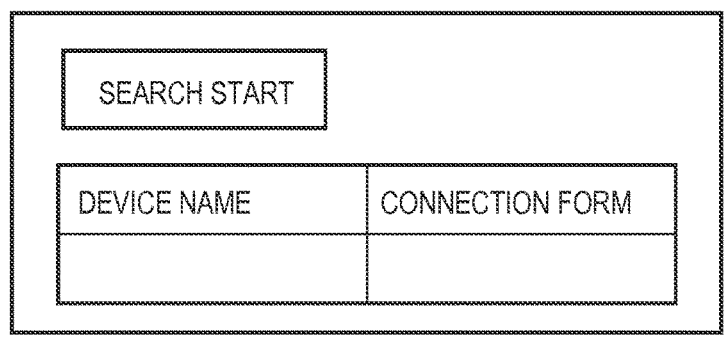
FIGS. 5A to 5D are views showing screen examples of a UI.

FIGS. 5A to 5D show screen examples of the UI. FIG. 5A shows a screen example at the start of search. When the user touches a "search start" button at the upper left portion of the screen (input of a user instruction indicating the start of search), search for a sink device is started. The screen example in FIG. 5A is one before the start of search, no device has been discovered yet, and neither a device name nor a connection form is displayed.

After the start of search is designated, the STA 101 broadcasts a Wi-Fi Display-compliant tunneled probe request to the wireless network 104 (S402). Strictly speaking, the AP 102 receives the frame of a tunneled probe request and transfers the frame of the tunneled probe request to wireless network devices participating in the wireless network 104, thereby implementing broadcast (S402). In the network configuration shown in FIG. 1, the tunneled probe request is received by the STA 103 participating in the wireless network 104, but is not received by the STA 105 not participating in the wireless network 104.

Upon receiving the tunneled probe request, the STA 103 transmits a Wi-Fi Display-compliant tunneled probe response to the STA 101 through the AP 102 (S403). The STA 101 receives the tunneled probe response to the transmitted tunneled probe request, and can discover the TDLS device. Further, Wi-Fi Display information elements (to be referred to as WFDIE hereinafter) indicating a Wi-Fi Display-compliant device are added to a tunneled probe response from a Wi-Fi Display-compliant device. From WFDIE added to the tunneled probe response, the STA 101 recognizes that the STA 103 is a Wi-Fi Display-compliant device.

Figure 5B:
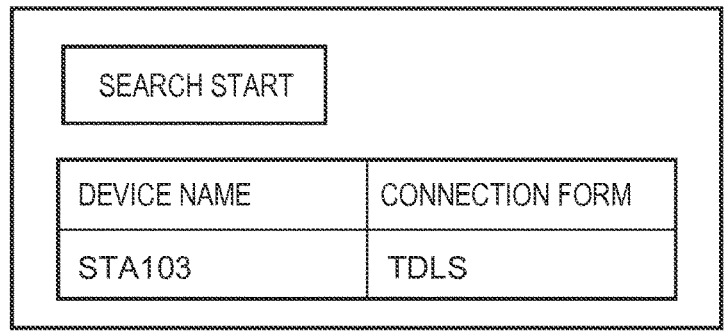

The STA 101 displays a device list of discovered TDLS devices (and Wi-Fi Display-compliant devices) on the UI (S404). FIG. 5B shows a screen example of the UI when the STA 103 is discovered as a TDLS device (and Wi-Fi Display-compliant device). As shown in FIG. 5B, the device name of the discovered device, and the connection form are displayed on the UI. The device name is preferably a name capable of identifying a discovered device by the user, such as Device Name of Device InfoAttribute or MAC (Media Access Control) address included in WFDIE. The connection form represents a network connection form when performing a wireless network connection to this device. The connection form of the STA 103 discovered as a TDLS device is displayed as "TDLS". If the user touches the display line of the STA 103 on the screen shown in FIG. 5B, the STA 101 starts connection processing with the STA 103.

Then, the STA 101 broadcasts a probe request complying with P2P device discovery in order to discover P2P devices (S405). This probe request includes SSID starting from the above-mentioned prefix "DIRECT-", P2PIE, and WFDIE. In the network configuration shown in FIG. 1, only the STA 105 serving as a P2P device transmits a probe response to the probe request from the STA 101 (S406). The AP 102 and the STA 103, which are not P2P devices, do not respond to the probe request from the STA 101. Although a probe request is transmitted only once in FIG. 4, probe requests are transmitted to all wireless channels in accordance with the scan phase of P2P device discovery. Further, a listen state and search state defined by Wi-Fi Direct® may be repeated to search for a P2P device.

In this manner, the STA 101 receives a probe response corresponding to a broadcast probe request, thereby discovering a P2P device. Further, WFDIE indicating a Wi-Fi Display-compliant device is added to a probe response from a Wi-Fi Display-compliant device. From WFDIE added to the probe response, the STA 101 recognizes that the STA 105 is a Wi-Fi Display-compliant device.

Figure 5C:
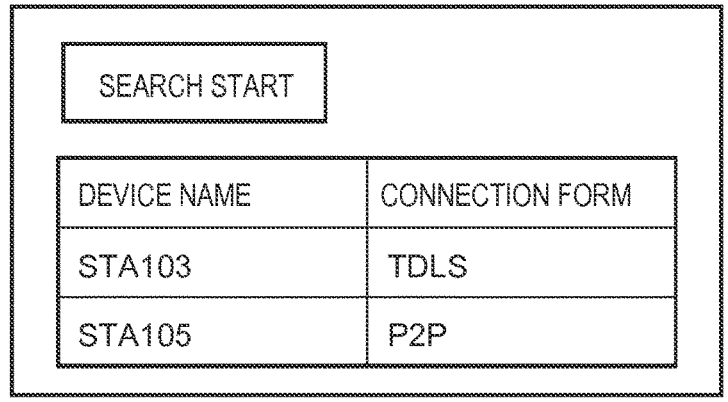
Figure 5D:
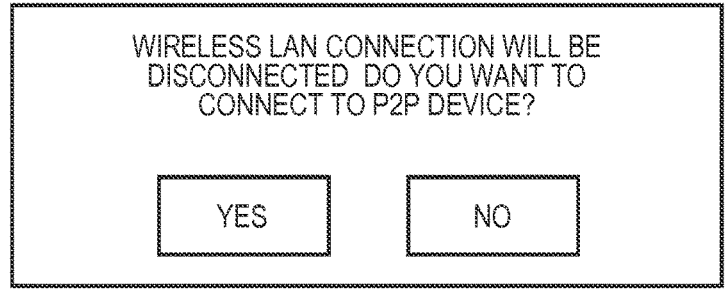

The STA 101 adds the P2P device (and Wi-Fi Display-compliant device) discovered by P2P device discovery to the device list displayed on the UI in step S404 (S407). The screen example in FIG. 5C shows a state in which the discovered STA 105 is added to the device list. As shown in FIG. 5C, the device names of the discovered devices, and connection forms are displayed on the UI. Since the STA 105 does not participate in the wireless network 104, only Wi-Fi Display connection by P2P is possible, and "P2P" is displayed as the connection form. If the user touches the display line of the STA 103 on the screen shown in FIG. 5C, the wireless LAN control unit 201 of the STA 101 starts TDLS connection processing with the STA 103. If the user touches the display line of the STA 105, the wireless LAN control unit 201 of the STA 101 starts P2P connection processing with the STA 105.

By displaying the categories of a TDLS device and P2P device as "connection form" on the UI, the user can be notified of a connection form with each Wi-Fi Display-compliant device. In the case of a TDLS connection, a device can execute Wi-Fi Display video transmission during participation in the wireless network 104. In the case of a P2P connection, a device needs to leave the wireless network 104.

User friendliness can be improved by notifying the user of a TDLS connection or a P2P connection by the display of the connection form. When a connection to a P2P device is designated, a warning dialog (FIG. 5D) representing that the STA 101 will leave the wireless network 104 can also be displayed. The warning dialog can prevent a situation in which upon connection to a P2P device, the STA 101 leaves the wireless network 104 before a user who does not know that the STA 101 will leave the wireless network 104 knows it.

By only touching the search start button, search for TDLS devices and search for P2P devices are sequentially executed. That is, at the time of searching for Wi-Fi Display devices, individual instructions to search for P2P devices and search for TDLS devices are unnecessary, and user friendliness can be improved.

Discovered TDLS devices and P2P devices are displayed on the same device list, and the user can select a device to be used for Wi-Fi Display without paying attention to the network configuration. Further, discovered TDLS devices and P2P devices are categorized and displayed so that they can be discriminated by the connection form, and the user can know in advance connection forms in the case of connections to these devices. This can prevent the STA 101 from leaving the wireless network 104 before the user knows it.

The user can know whether a discovered device is a device participating in the wireless network 104 in which the STA 101 participates, and can select a connection to the device in the same high-security wireless network 104.

When performing Wi-Fi Display with a TDLS device, a connection to the wireless network 104 can be maintained, which is considered to be highly user-friendly. Thus, search for TDLS devices is executed preferentially to search for P2P devices, and a discovered TDLS device is displayed at the top of the device list. The user can designate a connection to the TDLS device without waiting for a P2P device search result. The user can be prompted to preferentially select the TDLS device displayed at the top of the device list.

Second Embodiment

A communication apparatus and a control method of the communication apparatus according to the second embodiment of the present invention will be described below. In the second embodiment, the same reference numerals as those in the first embodiment denote the same parts, and a detailed description thereof will be sometimes omitted.

In the second embodiment, device search processing is controlled in accordance with the history of the connection form when video was transmitted by Wi-Fi Display. For this purpose, the Wi-Fi Display final connection form (to be referred to as "final connection form" hereinafter) is stored in a storage unit 206 according to the second embodiment. More specifically, a wireless LAN control unit 201 stores, in the storage unit 206, information about a connected wireless network device (information representing "TDLS" or "P2P" as at least the final connection form). A search control unit 204 searches for a device based on the final connection form.

[Search Processing]

Figure 6:
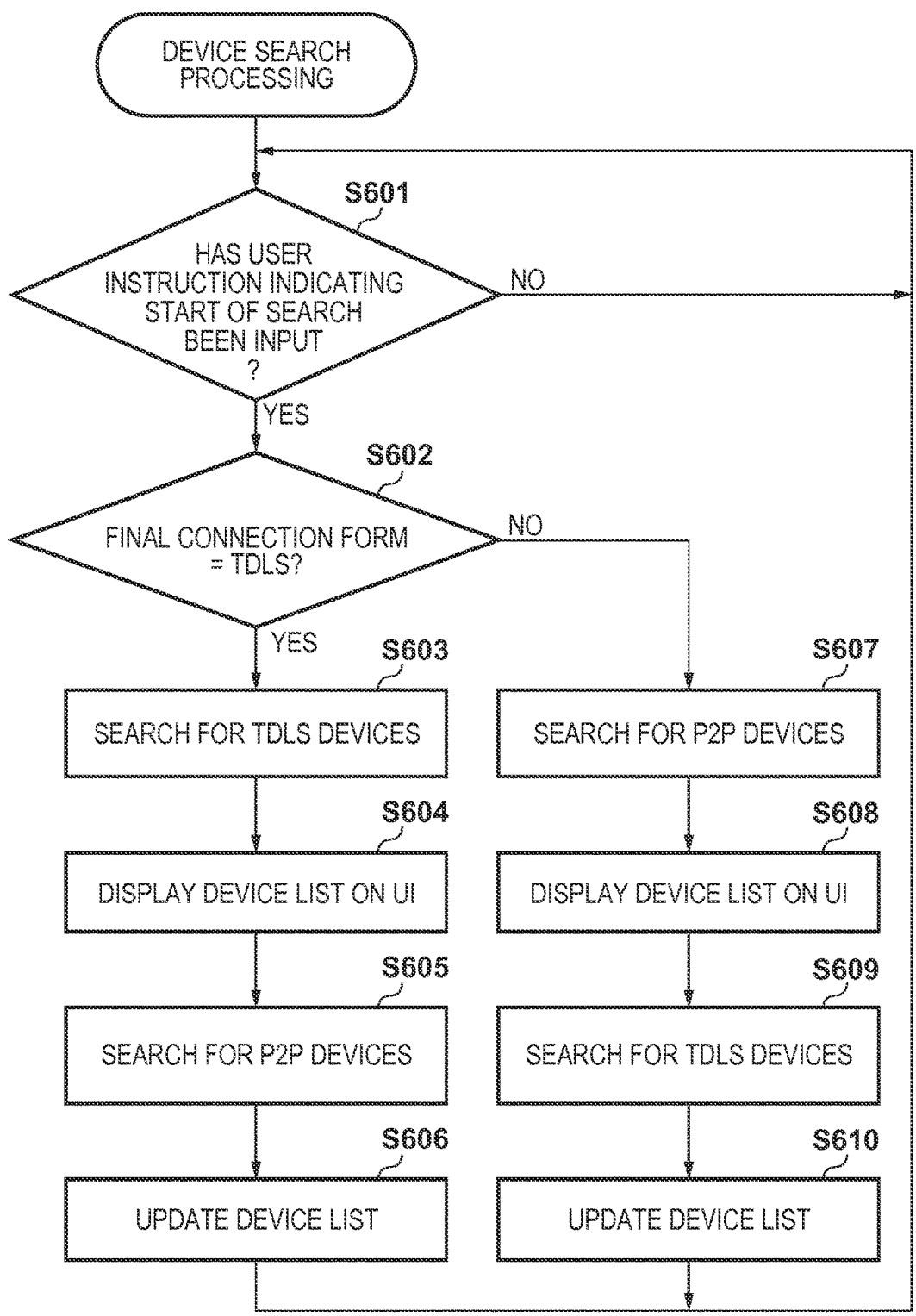
FIG. 6 is a flowchart for explaining device search processing according to the second embodiment that is executed at the start of Wi-Fi Display video streaming.

Device search processing according to the second embodiment that is executed at the start of Wi-Fi Display video streaming will be explained with reference to the flowchart of FIG. 6. The search control unit 204 of an STA 101 executes the search processing shown in FIG. 6. The search control unit 204 determines whether a search instruction has been input. If no search instruction has been input, the search control unit 204 waits for input of the search instruction (S601).

If the search instruction is input, the search control unit 204 determines, based on information stored in the storage unit 206, which of TDLS and P2P is the final connection form (S602). However, when no Wi-Fi Display connection has been performed even once (to be referred to as "Wi-Fi Display non-connection" hereinafter), no final connection form is stored in the storage unit 206. In this case, TDLS is determined as the final connection form.

If the final connection is TDLS (or Wi-Fi Display non-connection), the search control unit 204 advances the process in the order of TDLS device search and P2P device search, as in steps S302 to S305 (S603 to S606). The processes in steps S603 to S606 are the same as those in steps S302 to S305, and a detailed description thereof will not be repeated. In contrast, if the final connection is P2P, the search control unit 204 advances the process in the order of P2P device search and TDLS device search (S607 to S610).

More specifically, when the final connection is P2P, the search control unit 204 controls a P2P search unit 203 to search for P2P devices (S607). The search control unit 204 supplies a device list of discovered P2P devices to a UI control unit 205, and controls the UI control unit 205 to display the device list on the UI (S608). After the search for P2P devices, the search control unit 204 controls a TDLS search unit 202 to search for TDLS devices (S609). The search control unit 204 supplies, to the UI control unit 205, a device list to which discovered TDLS devices are added, controls the UI control unit 205 to update the display of the device list (S610), and returns the process to step S601.

In this fashion, priority is given to search for devices coping with a connection corresponding to the final connection form. When no P2P device is discovered, no device list is displayed on the UI in step S608. When no TDLS device is discovered, the device list displayed on the UI is not updated in step S610. Alternatively, when no P2P device is discovered and TDLS devices are discovered, a device list of only the TDLS devices is displayed on the UI in step S610.

[Search Sequence]

Figure 7:
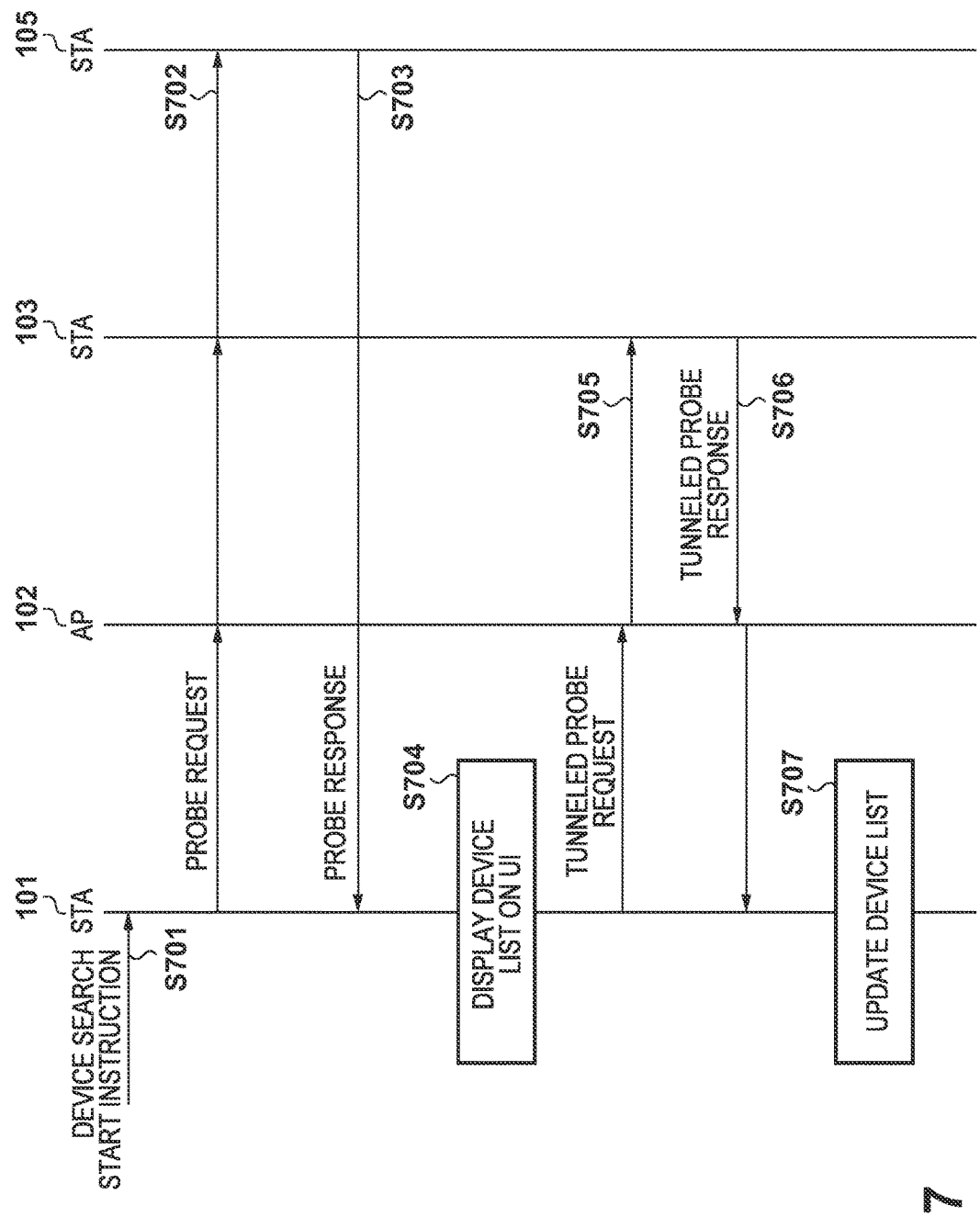
FIG. 7 is a chart for explaining a device search sequence according to the second embodiment that is executed at the start of Wi-Fi Display video streaming.

A device search sequence according to the second embodiment that is executed at the start of Wi-Fi Display video streaming will be explained with reference to FIG. 7. The user of the STA 101 designates the start of device search by operating the UI of the STA 101 in order to search for Wi-Fi Display-compliant devices (S701).

After the start of device search is designated, the final connection form is determined. The search sequence in FIG. 7 represents a case in which the final connection form is P2P. Note that a search sequence when the final connection form is TDLS is the same as the search sequence shown in FIG. 4.

The STA 101 broadcasts a probe request complying with P2P device discovery in order to discover P2P devices (S702). In the network configuration shown in FIG. 1, only an STA 105 serving as a P2P device transmits a probe response to the probe request from the STA 101 (S703). The STA 101 receives the probe response corresponding to the probe request, thereby discovering the STA 105 serving as a P2P device. Note that the probe request and the probe response have been explained in the first embodiment, and a detailed description thereof will not be repeated.

Figure 8A:
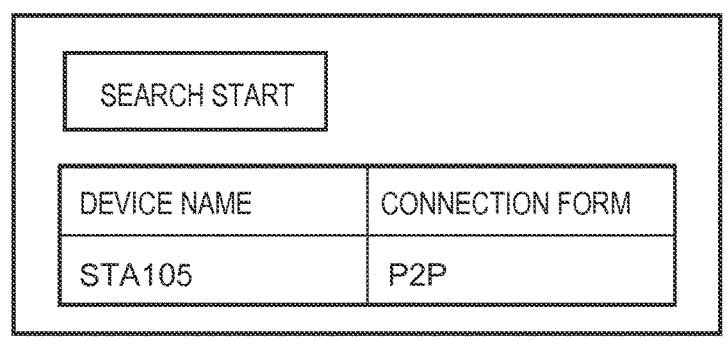
FIGS. 8A to 8C are views showing screen examples of a UI according to the second embodiment.
Figure 8B:
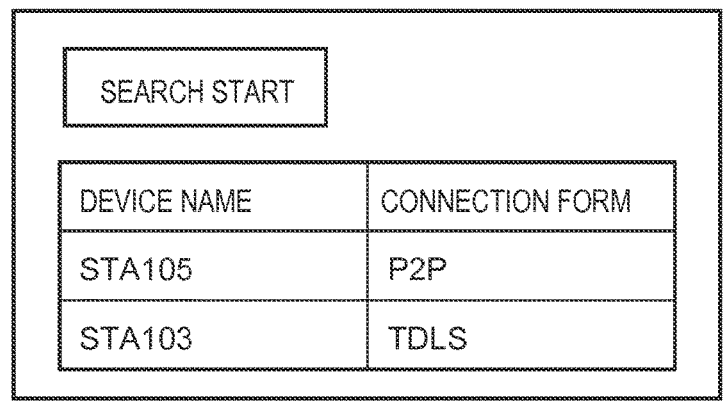
Figure 8C:
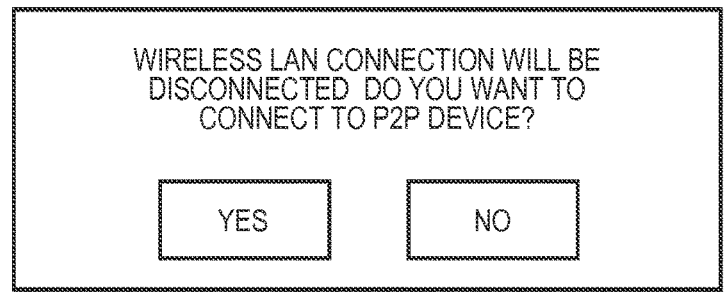

The STA 101 displays a device list of discovered P2P devices (and Wi-Fi Display-compliant devices) on the UI (S704). FIGS. 8A to 8C show screen examples of the UI according to the second embodiment. FIG. 8A shows a screen example of the UI when the STA 105 is discovered as a P2P device (and Wi-Fi Display-compliant device). If the user touches the display line of the STA 105 on the screen shown in FIG. 8A, the wireless LAN control unit 201 of the STA 101 starts connection processing with the STA 105.

The STA 101 broadcasts a Wi-Fi Display-compliant tunneled probe request to a wireless network 104 in order to discover TDLS devices (S705). In the network configuration shown in FIG. 1, an STA 103 transmits a Wi-Fi Display-compliant tunneled probe response to the STA 101 through an AP 102 (S706). The STA 101 receives the tunneled probe response to the tunneled probe request, discovering the STA 103 serving as a TDLS device. Note that the tunneled probe request and the tunneled probe response have been explained in the first embodiment, and details thereof will not be repeated.

The STA 101 adds the discovered TDLS device (and Wi-Fi Display-compliant device) to the device list displayed on the UI in step S704 (S707). The screen example in FIG. 8B shows a state in which the discovered STA 103 is added to the device list. The display format of the screen example in FIG. 8B is the same as that in FIG. 5C except that the STA 105 is displayed at the top of the list.

If the user touches the display line of the STA 105 on the screen shown in FIG. 8B, the wireless LAN control unit 201 of the STA 101 starts P2P connection processing with the STA 105. If the user touches the display line of the STA 103, the wireless LAN control unit 201 of the STA 101 starts TDLS connection processing with the STA 103.

That is, in the second embodiment, when the final connection form is P2P, it is considered that the user is highly likely to perform a P2P connection again, and the STA 105 of the P2P connection is displayed at the top of the list. Since a device of the same connection form as the final connection form is displayed first and displayed at the top of the list, this is convenient when the user desires a connection to a device of the same connection form.

Needless to say, in the case of a P2P connection, a device needs to leave the wireless network 104. When a P2P device is selected, a warning screen (FIG. 8C) may be displayed, as in the first embodiment. If the warning screen as shown in FIG. 8C is displayed every time though the user intends to connect to a P2P device, the user may be bothered. It is therefore preferable that the user can set whether to display the warning screen.

It is also possible to preferentially display a previously connected device by using information of a past connection form (to be referred to as "connection history" hereinafter) regardless of the final connection form, and display it at the top of a list. In other words, any search and display may be performed as long as search for a device and display of a device list are performed using the connection history. For example, priority is given to search and display of a P2P device when the P2P connection count is high in past 10 connections, and to search and display of a TDLS device when the TDLS connection count is high. Alternatively, a device connection form having a maximum connection count in past 10 connections may be preferentially searched for and displayed.

By controlling the search order using the connection history stored in the storage unit 206 in this way, discovered wireless network devices can be arranged from the top of the device list in the search order. As a result, a device corresponding to the connection form of a device connected in the past is preferentially searched for and displayed. Search and display considering a Wi-Fi Display-compliant device frequently used by the user can be performed.

Third Embodiment

A communication apparatus and a control method of the communication apparatus according to the third embodiment of the present invention will be described below. In the third embodiment, the same reference numerals as those in the first and second embodiments denote the same parts, and a detailed description thereof will be sometimes omitted.

The third embodiment will explain an example in which, when the same device is discovered in both P2P device search and TDLS device search, a fact that this device is capable of a P2P connection and a TDLS connection is displayed in a device list. In the third embodiment, an STA 103 shown in FIG. 1 includes two virtual wireless network interfaces.

One interface of the STA 103 is an interface for an infrastructure network (to be referred to as "infrastructure interface" hereinafter) for participating in a wireless network 104. The other interface of the STA 103 is a P2P interface for operating as a P2P device. Assume that the STA 103 is neither P2P GO nor P2P Client, and is in the listen state and in a standby state in which it waits for a connection request from another device.

[Apparatus Arrangement]

Figure 9:
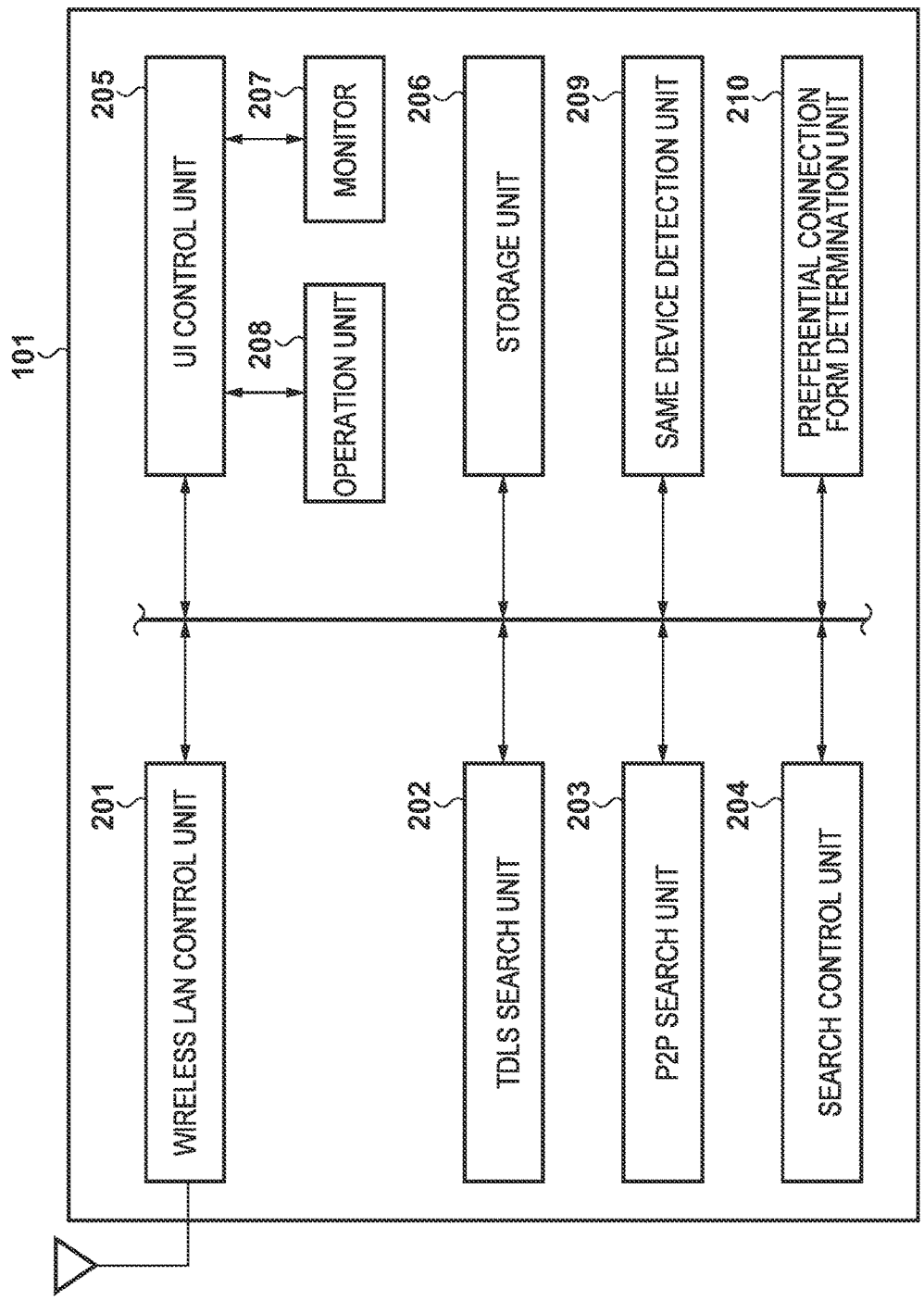
FIG. 9 is a block diagram showing the functional arrangement of a wireless network apparatus according to the third embodiment.

The functional arrangement of an STA 101 according to the third embodiment is shown in the block diagram of FIG. 9. A same device detection unit 209 detects the same device from P2P devices and TDLS devices discovered by a search control unit 204. A preferential connection form determination unit 210 determines a connection form to be preferentially displayed for the same device detected by the same device detection unit 209. Note that computer programs for implementing the same device detection unit 209 and the preferential connection form determination unit 210 are stored in a storage unit 206.

[Search Processing]

Figure 10:
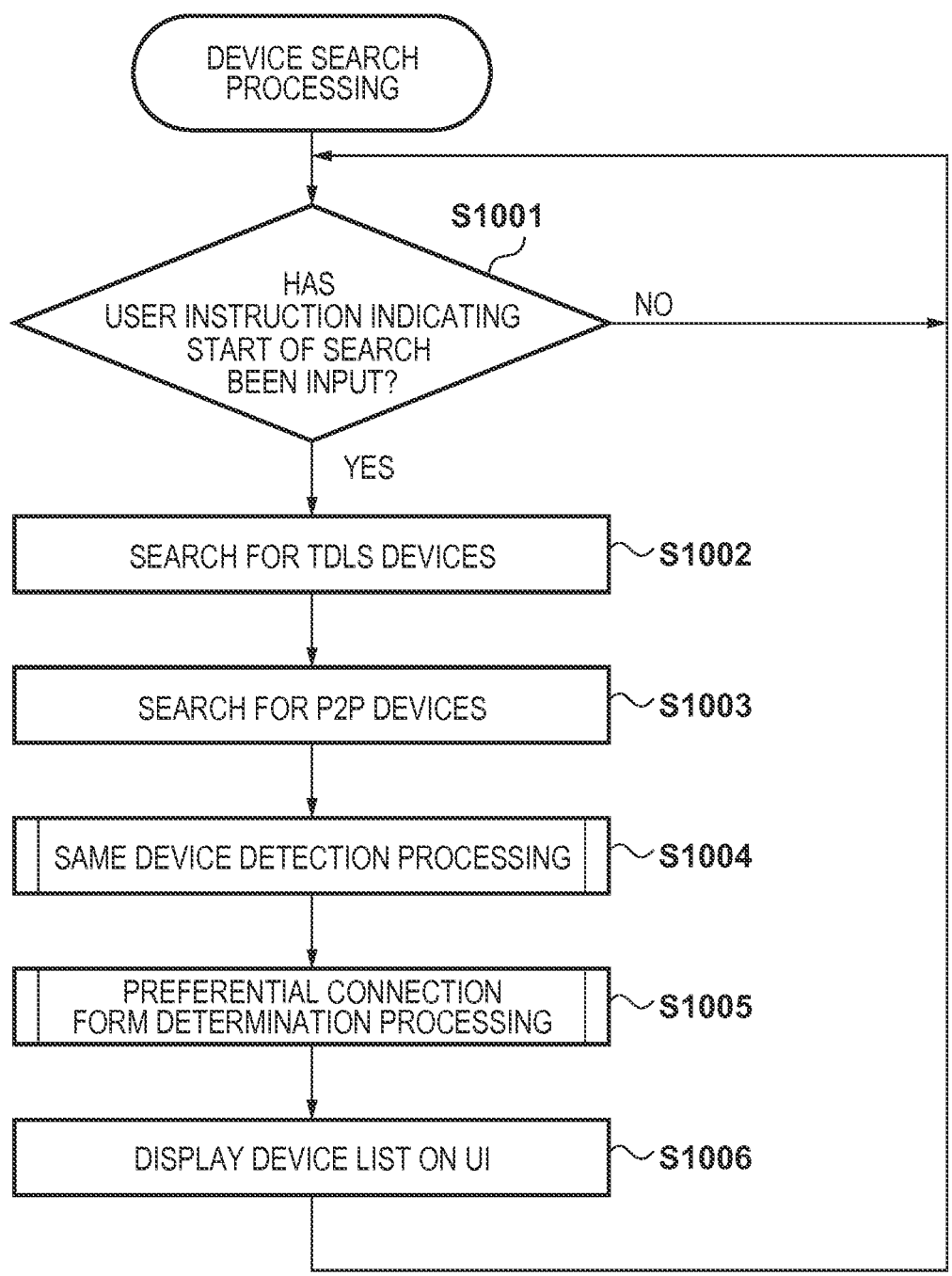
FIG. 10 is a flowchart for explaining device search processing according to the third embodiment that is executed at the start of Wi-Fi Display video streaming.

Device search processing according to the third embodiment that is executed at the start of Wi-Fi Display video streaming will be explained with reference to the flowchart of FIG. 10. The search control unit 204, same device detection unit 209, and preferential connection form determination unit 210 of the STA 101 execute the search processing shown in FIG. 10.

The search control unit 204 determines whether a search instruction has been input. If no search instruction has been input, the search control unit 204 waits for input of the search instruction (S1001). If the search instruction is input, the search control unit 204 controls a TDLS search unit 202 to search for TDLS devices (S1002), and controls a P2P search unit 203 to search for P2P devices (S1003). Note that TDLS device search and P2P device search are the same as those in the first embodiment, and details thereof will not be repeated.

The same device detection unit 209 executes processing of detecting the same device from the discovered TDLS devices and P2P devices (S1004). After the end of the same device detection processing, the preferential connection form determination unit 210 executes processing of determining a connection form (to be referred to as "preferential connection form" hereinafter) that is preferably used preferentially for the detected same device (S1005).

If the same device is detected and the preferential connection form is determined, the search control unit 204 supplies a device list based on the determination result to a UI control unit 205, controls the UI control unit 205 to display the device list (S1006), and then returns the process to step S1001. If the same device is not detected, the search control unit 204 supplies a device list of discovered devices to the UI control unit 205.

Detection of Same Device

Figure 11:
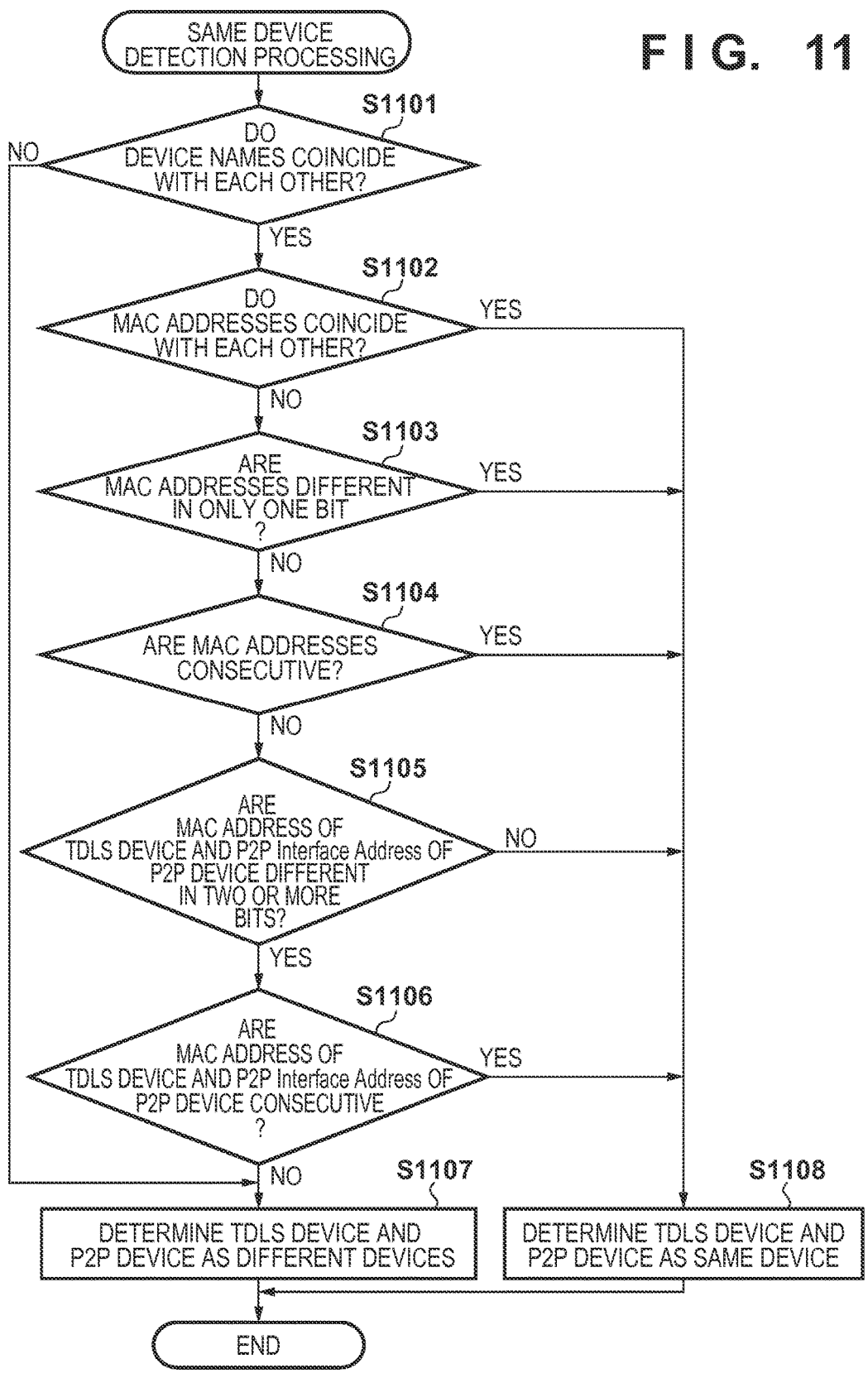
FIG. 11 is a flowchart for explaining processing of a same device detection unit.

The processing (S1004) of the same device detection unit 209 will be explained with reference to the flowchart of FIG. 11. Although FIG. 11 shows processing of determining whether paired TDLS and P2P devices are the same device, processing of determining whether paired devices are the same device is performed for all combinations of all discovered devices.

The same device detection unit 209 compares the device name of a TDLS device and the device name of a P2P device (S1101). As for the device name, the same device detection unit 209 suffices to refer to Device Name of Device InfoAttribute included in WFDIE or P2PIE. If the device names are different, the same device detection unit 209 determines that the TDLS device and the P2P device are different devices (S1107), and ends the process for the current combination of the TDLS device and P2P device.

If the device names coincide with each other, the same device detection unit 209 compares the MAC address of the TDLS device and the MAC address of the P2P device (S1102). If the MAC addresses coincide with each other, the same device detection unit 209 determines that the TDLS device and the P2P device are the same device (S1108), and ends the process for the current combination of the TDLS device and P2P device.

If the MAC addresses do not coincide with each other, the same device detection unit 209 determines whether the MAC addresses are different in only one bit (S1103). If the MAC addresses are different in only one bit, the same device detection unit 209 determines that the TDLS device and the P2P device are the same device (S1108), and ends the process for the current combination of the TDLS device and P2P device. This determination considers a case in which when one device includes a plurality of interfaces, MAC addresses in which only one specific bit has been changed are used as the MAC addresses of these interfaces. For example, the MAC address of the infrastructure interface is xx:xx:xx:85:00:01, and the MAC address of the P2P interface is xx:xx:xx:85:01:01. For this reason, when device names coincide with each other and MAC addresses are different by only one bit, it is determined that the TDLS device and the P2P device are the same device. Note that the upper 3 octet (xx:xx:xx) of the MAC address indicates an OUI (Organizationally Unique Identifier) for identifying a device vendor or the like, and does not change for the same device.

If the MAC addresses are different by two or more bits, the same device detection unit 209 determines whether the MAC addresses are consecutive (S1104). If the MAC addresses are consecutive, the same device detection unit 209 determines that the TDLS device and the P2P device are the same device (S1108), and ends the process for the current combination of the TDLS device and P2P device. This determination considers a case in which when one device includes a plurality of interfaces, consecutive addresses are used as the MAC addresses of these interfaces. For example, xx:xx:xx:85:00:03 and xx:xx:xx:85:00:04 are different by two bits but are consecutive addresses. Similarly, xx:xx:xx:85:00:ff and xx:xx:xx:85:01:00 are different by 17 bits but are consecutive addresses.

If the MAC addresses are inconsecutive, the same device detection unit 209 performs determination using P2P Interface Address. P2P Interface Address is defined by Wi-Fi Direct® and is included in Intended P2P Interface Address Attribute of P2PIE. P2P Interface Address is an address used when a device participates in a P2P group. The same device detection unit 209 determines whether the MAC address of the TDLS device and the P2P Interface Address of the P2P device are different in two or more bits (S1105). If these addresses are the same or are different in only one bit, the same device detection unit 209 determines that the TDLS device and the P2P device are the same device (S1108), and ends the process for the current combination of the TDLS device and P2P device.

If these addresses are different by two or more bits, the same device detection unit 209 determines whether the MAC address of the TDLS device and the P2P Interface Address of the P2P device are consecutive (S1106). If these addresses are consecutive, the same device detection unit 209 determines that the TDLS device and the P2P device are the same device (S1108). If these addresses are inconsecutive, the same device detection unit 209 determines that the TDLS device and the P2P device are different devices (S1107), and ends the process for the current combination of the TDLS device and P2P device.

Determination of Preferential Connection Form

Figure 12:
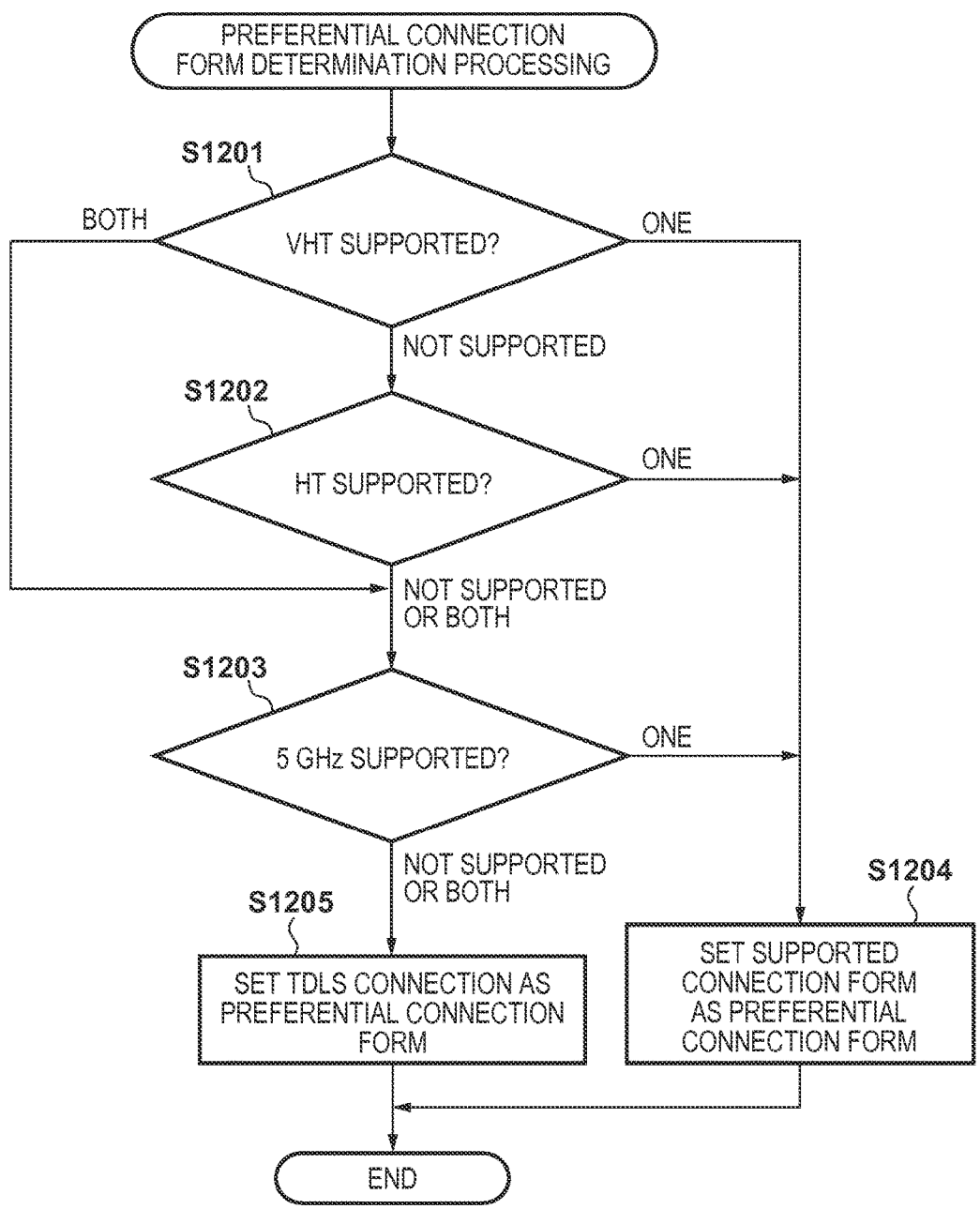
FIG. 12 is a flowchart for explaining processing of a preferential connection form determination unit.

The processing (S1005) of the preferential connection form determination unit 210 will be explained with reference to the flowchart of FIG. 12. The processing shown in FIG. 12 is executed by comparing, for a TDLS device and P2P device that are determined to be the same device, capability information of this device serving as the TDLS device that is included in a tunneled probe response, and capability information of this device serving as the P2P device that is included in a probe response.

When a TDLS connection or a P2P connection is performed, the preferential connection form determination unit 210 determines whether a VHT (Very High Throughput) operation defined by IEEE802.11ac is possible, that is, whether VHT is supported (S1201). Whether VHT is supported is determined based on whether VHTIE (VHT Information Elements) is added to a tunneled probe response or a probe response. If VHTIE is added to only a tunneled probe response, the preferential connection form determination unit 210 determines the TDLS connection as the preferential connection form. If VHTIE is added to only a probe response, the preferential connection form determination unit 210 determines the P2P connection as the preferential connection form (S1204). That is, when the VHT operation is possible, high-speed communication becomes possible, and the VHT-compliant connection form is determined as the preferential connection form.

If neither the TDLS connection nor the P2P connection supports VHT, the preferential connection form determination unit 210 determines whether an HT (High Throughput) operation defined by IEEE802.11ac is possible, that is, whether HT is supported (S1202). Whether HT is supported is determined based on whether HTIE (HT Information Elements) is added to a tunneled probe response or a probe response. If HTIE is added to only a tunneled probe response, the preferential connection form determination unit 210 determines the TDLS connection as the preferential connection form. If HTIE is added to only a probe response, the preferential connection form determination unit 210 determines the P2P connection as the preferential connection form (S1204). That is, when the HT operation is possible, high-speed communication becomes possible (though not so high in comparison with VHT), and the HT-compliant connection form is determined as the preferential connection form.

If both the TDLS connection and the P2P connection support VHT, or both the TDLS connection and the P2P connection support HT or do not support it, the preferential connection form determination unit 210 determines whether communication in the 5-GHz band is possible, that is, 5 GHz is supported (S1203). Whether 5 GHz is supported is determined based on whether a channel of the 5-GHz band exists in Supported Channels included in a tunneled probe response, or Channel List Attribute of P2PIE included in a probe response. If a channel of the 5-GHz band exists in only a tunneled probe response, the preferential connection form determination unit 210 determines the TDLS connection as the preferential connection form. If a channel of the 5-GHz band exists in only a probe response, the preferential connection form determination unit 210 determines the P2P connection as the preferential connection form (S1204). That is, a connection form coping with the 5-GHz band in which there is little noise and congestion is relatively light is determined as the preferential connection form.

If both the TDLS connection and the P2P connection support 5 GHz or do not support it, the preferential connection form determination unit 210 determines, as the preferential connection form, the TDLS connection capable of executing Wi-Fi Display without leaving the wireless network 104 (S1205).

[Search Sequence]

Figure 13:
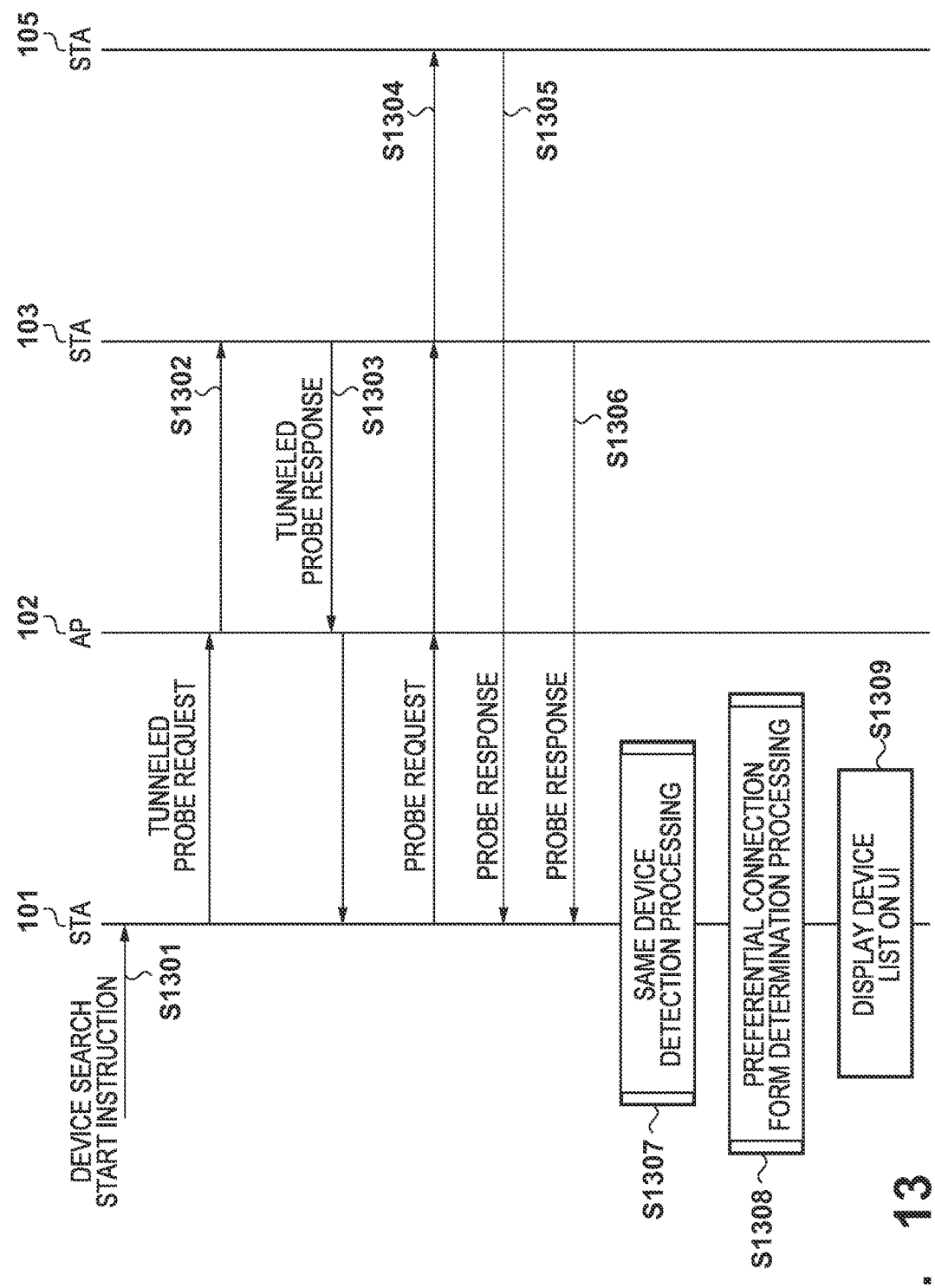
FIG. 13 is a chart for explaining a device search sequence according to the third embodiment that is executed at the start of Wi-Fi Display video streaming.

A device search sequence according to the third embodiment that is executed at the start of Wi-Fi Display video streaming will be explained with reference to FIG. 13. The user of the STA 101 designates the start of device search by operating the UI of the STA 101 in order to search for Wi-Fi Display-compliant devices (S1301).

After the start of search is designated, the STA 101 broadcasts a Wi-Fi Display-compliant tunneled probe request to the wireless network 104 (S1302). Upon receiving the tunneled probe request, the STA 103 transmits a Wi-Fi Display-compliant tunneled probe response to the STA 101 through an AP 102 (S1303). Note that the tunneled probe request and the tunneled probe response have been explained in the first embodiment, and details thereof will not be repeated. An infrastructure interface is used for reception of the tunneled probe request and transmission of the tunneled probe response in the STA 103.

Then, the STA 101 broadcasts a probe request complying with P2P device discovery in order to discover P2P devices (S1304). An STA 105 serving as a P2P device transmits a probe response to the probe request (S1305), and the STA 103 serving as a P2P device transmits a probe response (S1306). Note that the probe request and the probe response have been explained in the first embodiment, and details thereof will not be repeated. A P2P interface is used for reception of the probe request and transmission of the probe response in the STA 103.

The STA 101 performs same device detection processing by using the search result (S1307), performs preferential connection form determination processing (S1308), supplies a device list complying with the preferential connection form to the UI control unit 205, and controls the UI control unit 205 to display the device list on the UI (S1309).

The following description assumes that the MAC address of the infrastructure interface and the MAC address of the P2P interface in the STA 103 are different by only one bit, and device names coincide with each other as "STA 103". Also, assume that the device name of the STA 105 is "STA 105". That is, in the same device detection processing based on responses in steps S1303 and S1305, it is determined that "the MAC addresses are different by only one bit" (S1103). As a result, it is determined that the STA 103 which transmitted the tunneled probe response in step S1303 and the STA 103 which transmitted the probe response in step S1305 are the same device (S1108).

To the contrary, in the same device detection processing based on responses in steps S1303 and S1306, it is determined that "the device names do not coincide with each other" (S1101). As a result, it is determined that the STA 103 which transmitted the tunneled probe response in step S1303 and the STA 105 which transmitted the probe response in step S1306 are different devices (S1107).

FIGS. 14A to 14C show display examples of the device list based on the determination result of a preferential connection form. FIG. 14A shows a display example when it is determined that the TDLS connection is the preferential connection form. As shown in FIG. 14A, TDLS and P2P are displayed as connection forms of the STA 103, and the TDLS connection serving as the preferential connection form is arranged at the top of the list. A display that guides a selection by the user to the TDLS connection is also possible by, for example, displaying the TDLS connection of the STA 103 by black characters or bold face, and displaying the P2P connection by gray characters or light face. In FIG. 14A, the connection form of the STA 105 is only the P2P connection, and only P2P is displayed in the connection form column.

FIG. 14B shows a display example when it is determined that the P2P connection is the preferential connection form. As shown in FIG. 14B, TDLS and P2P are displayed as connection forms of the STA 103, and the P2P connection serving as the preferential connection form is arranged at the top of the list. A display that guides a selection by the user to the P2P connection is also possible by, for example, displaying the P2P connection of the STA 103 by black characters or bold face, and displaying the TDLS connection by gray characters or light face. In FIG. 14B, the connection form of the STA 105 is only the P2P connection, and only P2P is displayed in the connection form column.

It is also possible to display only the preferential connection form without displaying a connection form that is not a preferential connection form, as shown in FIG. 14C. FIG. 14C shows a display example when it is determined that the TDLS connection is the preferential connection form of the STA 103. If only the preferential connection form is displayed, a user who is not familiar with a wireless network need not select the TDLS connection or the P2P connection in the same device, and can avoid confusion.

Although FIGS. 14A to 14C show an example in which the STA 103 is arranged at the top of the list with respect to the STA 105, this order is arbitrarily the discovery order, device name order, address order, or the like. When the P2P connection is selected in each of the display screens shown in FIGS. 14A to 14C, a warning message can also be displayed, as in the first embodiment.

As described above, when one device supports both the P2P connection and the TDLS connection, the device is not repetitively arranged in the device list but is arranged as one device in the device list. The user can easily recognize the device supporting both the P2P connection and the TDLS connection. At this time, a connection form capable of higher-speed communication is displayed as the preferential connection form at the top of the list, and the user can easily select the connection form capable of higher-speed communication.

When one device supports both the P2P connection and the TDLS connection, only the preferential connection form of the device can be described in the device list to avoid confusion of the user. Note that when one device supports both the P2P connection and the TDLS connection, it is preferable that the user can set whether to display both the preferential connection form and the non-preferential connection form, or display only the preferential connection form.

Modification of Embodiments

An example has been explained above, in which when searching for a device in the participated wireless network 104, a TDLS device is searched for by using a tunneled probe request and response. However, the device need not always be TDLS, and any method is available as long as a device in the participated wireless network 104 is searched for. For example, a device may be searched for by using a protocol such as UPnP® or Bonjour®.

Also, an example has been described, in which when searching for a device without designating a wireless network, P2P device discovery defined by Wi-Fi Direct® is used. However, any method is available as long as a wireless network is not designated. Any search is usable as long as a discovered device is displayed on the device list or the search is started by the same trigger.

Further, an example has been described above, in which a device in the wireless network 104 is searched for on the premise that the STA 101 participates in the wireless network 104. However, there are conceivable a case in which the STA 101 does not participate in any wireless network, and a case in which the STA 101 includes a plurality of wireless network interfaces and can participate in a plurality of wireless networks. In such a case, the search control unit 204 may designate a participable wireless network, and control the TDLS search unit 202 to search for another STA. In other words, the search control unit 204 according to each of the first to third embodiments designates the wireless network 104 in which the STA 101 participates, and controls the TDLS search unit 202 to search for another STA.

When a wireless network is designated to search for another STA, the device list presents a wireless network to which a discovered STA belongs, in addition to a column for displaying information (for example, SSID or ESSID) of a wireless network. Note that the participable wireless network is a wireless network for which, for example, the search control unit 204 can acquire or knows information (for example, SSID or ESSID) of the wireless network and holds a pre-shared key or the like for participating in this wireless network.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc® (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-179519 filed Sep. 3, 2014 which is hereby incorporated by reference herein in its entirety.

What is claimed is:

1. A communication apparatus comprising:
at least one memory storing instructions; and
at least one processor that, upon execution of instructions stored in the at least one memory, causes the communication apparatus to:
accept one instruction from a user;
execute, in accordance with the one instruction, a first search and a second search, wherein the first search is for searching for a first other communication apparatus in a first wireless network in which the communication apparatus is , and wherein the second search is for searching, by a method different from the first search, for a second other communication apparatus that is directly connectable to the communication apparatus in a second wireless network different from the first wireless network;
discriminably display, on a display unit, information of the first other communication apparatus detected by the first search and information of the second other communication apparatus detected by the second search; and
receive a user input indicating one of the first other communication apparatus and the second other communication apparatus as a connection target; and
perform control to initiate a connection with the connection target indicated by the received user input,
wherein, in a case where the received user input indicates that
the second other communication apparatus detected by the second search is the connection target,
the communication apparatus displays on the display unit information indicating that the communication apparatus will leave the first wireless network and prompting the user for confirmation to proceed with the second other communication apparatus as the connection target, and
the communication apparatus leaves the first wireless network and proceeds to initiate the connection with the second other communication apparatus if confirmation to proceed is received from the user, and
in a case where the received user input indicates that the first other communication apparatus detected by the first search is the connection target, the communication apparatus proceeds to initiate the connection with the first other communication apparatus without displaying the information indicating that the communication apparatus will leave the first wireless network.

2. The communication apparatus according to claim 1, wherein the communication apparatus controls to sequentially perform the first search and the second search.

3. The communication apparatus according to claim 1, wherein the communication apparatus displays, as a list, the information of the first other communication apparatus detected by the first search and the information of the second other communication apparatus detected by the second search.

4. The communication apparatus according to claim 3, wherein the communication apparatus displays the information of the first other communication apparatus detected by the first search at a higher position of the list than the information of the second other communication apparatus detected by the second search.

5. The communication apparatus according to claim 1, wherein the at least one memory stores a connection history of the communication apparatus, and
wherein the communication apparatus displays, on the display unit, the information of the first other communication apparatus detected by the first search and the information of the second other communication apparatus detected by the second search in an order corresponding to the connection history.

6. The communication apparatus according to claim 1, wherein the at least one memory stores a connection history of the communication apparatus, and
wherein the communication apparatus performs the first search for the first other communication apparatus by designating a wireless network and the second search for the second other communication apparatus without designation of a wireless network in an order corresponding to the connection history.

7. The communication apparatus according to claim 1, wherein the communication apparatus displays only one search result for another communication apparatus that is repetitively detected by the first search and the second search.

8. The communication apparatus according to claim 1, wherein, in a case where the communication apparatus is connected to another communication apparatus that is detected by one of the first search and the second search, the communication apparatus performs video streaming to the connected communication apparatus.

9. A control method of a communication apparatus, the method comprising:
using a processor to perform:
accepting one instruction from a user;
executing, in accordance with the one instruction, a first search and a second search, wherein the first search is for searching for a first other communication apparatus in a first wireless network in which the communication apparatus is, and wherein the second search is for searching for a second other communication apparatus that is directly connectable to the communication apparatus in a second wireless network different from the first wireless network;
discriminably displaying, on a display unit, information of the first other communication apparatus detected by the first search and information of the second other communication apparatus detected by the second search;
receiving a user input indicating one of the first other communication apparatus and the second other communication apparatus as a connection target; and
performing control to initiate a connection with the connection target indicated by the received user input,
wherein, in a case where the received user input indicates that the second other communication apparatus detected by the second search is the connection target, the communication apparatus displays
on the display unit, information indicating that the communication apparatus will leave the first wireless network and prompting the user for confirmation to proceed with the second other communication apparatus as the connection target, and
the communication apparatus leaves the first wireless network and proceeds to initiate the connection with the second other communication apparatus if confirmation to proceed is received from the user, and
in a case where the received user input indicates that the first other communication apparatus detected by the first search is the connection target, the communication apparatus proceeds to initiate the connection with the first other communication apparatus without displaying the information indication that the communication apparatus will leave the first wireless network.

10. A non-transitory computer readable medium storing a computer-executable program for causing a computer to perform a control method of a communication apparatus, the method comprising:
accepting one instruction from a user;
executing, in accordance with the one instruction, a first search and a second search, wherein the first search is for searching for a first other communication apparatus in a first wireless network in which the communication apparatus is, and wherein the second search is for searching for a second other communication apparatus that is directly connectable to the communication apparatus in a second wireless network different from the first wireless network;
discriminably displaying, on a display unit, information of the first other communication apparatus detected by the first search and information of the second other communication apparatus detected by the second search;
receiving a user input indicating one of the first other communication apparatus and the second other communication apparatus as a connection target: and
performing control to initiate a connection with the connection target indicated by the received user input,
wherein, in a case where the received user input indicates that the second other communication apparatus detected by the second search is the connection target, the communication apparatus displays on the display unit, information indicating that the communication apparatus will leave the first wireless network and prompting the user for confirmation to proceed with the second other communication apparatus as the connection target, and
the communication apparatus leaves the first wireless network and proceeds to initiate the connection with the second other communication apparatus if confirmation to proceed is received from the user, and
in a case where the received user input indicates that the first other communication apparatus detected by the first search is the connection target, the communication apparatus proceeds to initiate the connection with first other communication apparatus without displaying the information indication that the communication apparatus will leave the first wireless network,
performing control to:
1) display, on the display unit, information indicating that the communication apparatus leaves the first wireless network, in a case where the second other apparatus detected by the second search is selected as a connection target of the communication apparatus, and
2) not display, on the display unit, the information indicating that the communication apparatus leaves the first wireless network, in a case where the first other apparatus detected by the first search is selected as the connection target of the communication apparatus.

11. The communication apparatus according to claim 1, wherein the communication apparatus can set whether or not to display the information indicating that the communication apparatus leaves the first wireless network in a case where the second other apparatus detected by the second search is selected as a connection target of the communication apparatus.

12. The communication apparatus according to claim 1, wherein the first other communication apparatus is directly connectable to the communication apparatus.

* * * * *